(12) United States Patent
Zhang

(10) Patent No.: US 12,665,855 B2
(45) Date of Patent: Jun. 23, 2026

(54) UPLINK TRANSMISSION METHOD IN WIRELESS LOCAL AREA NETWORK (WLAN) AND STATION DEVICE

(71) Applicants: ESPRESSIF SYSTEMS (SHANGHAI) CO., LTD., Shanghai (CN); ESPRESSIF INTEGRATION ASSOCIATES CO., LTD., Shanghai (CN)

(72) Inventor: Qin Zhang, Shanghai (CN)

(73) Assignees: ESPRESSIF SYSTEMS (SHANGHAI) CO., LTD., Shanghai (CN); ESPRESSIF INTEGRATION ASSOCIATES CO., LTD., Shanghai (CN)

( * ) Notice: Subject to any disclaimer, the term of this patent is extended or adjusted under 35 U.S.C. 154(b) by 359 days.

(21) Appl. No.: 18/278,599

(22) PCT Filed: Dec. 31, 2021

(86) PCT No.: PCT/CN2021/143717
§ 371 (c)(1),
(2) Date: Aug. 23, 2023

(87) PCT Pub. No.: WO2022/179310
PCT Pub. Date: Sep. 1, 2022

(65) Prior Publication Data
US 2024/0137324 A1 Apr. 25, 2024
US 2024/0236008 A9 Jul. 11, 2024

(30) Foreign Application Priority Data

Feb. 23, 2021 (CN) .......................... 202110198239.4

(51) Int. Cl.
*H04L 47/2483* (2022.01)
*H04L 47/2425* (2022.01)
(Continued)

(52) U.S. Cl.
CPC ...... *H04L 47/2483* (2013.01); *H04L 47/2433* (2013.01); *H04W 28/0278* (2013.01); *H04W 84/12* (2013.01)

(58) Field of Classification Search
CPC ............. H04L 47/2483; H04L 47/2433; H04L 47/6215; H04L 47/6275; H04W 28/0278; (Continued)

(56) References Cited

U.S. PATENT DOCUMENTS

| | | | |
|---|---|---|---|
| 10,708,958 B2 | 7/2020 | Ryu | |
| 2017/0257196 A1* | 9/2017 | Ghosh | ................... H04L 1/1854 |

(Continued)

FOREIGN PATENT DOCUMENTS

| | | |
|---|---|---|
| CN | 101657029 A | 2/2010 |
| CN | 106332261 A | 1/2017 |
| CN | 107750473 A | 3/2018 |
| CN | 107836132 A | 3/2018 |
| CN | 109923930 A | 6/2019 |
| CN | 112566269 A | 3/2021 |

OTHER PUBLICATIONS

Lee WH, Hwang HY (2019) A-MPDU aggregation with optimal No. of MPDUs for delay requirements in IEEE 802.11ac. PLoS ONE 14(3): e0213888 Mar. 20, 2019.

*Primary Examiner* — Jung H Park
(74) *Attorney, Agent, or Firm* — Aird & McBurney LP

(57) ABSTRACT

An uplink transmission method operated by a station (STA) for transmitting data to an access point (AP) in a wireless local area network (WLAN), and a station device executing the method. The method includes: the station receiving a trigger frame from the access point, selecting one or more data packets from a plurality of transmit queues at the station and aggregating them into the A-MPDU to proceed with transmission to the access point based on the trigger frame. The selecting one or more data packets from the plurality of transmit queues includes: determining a priority value for each of the transmit queues; grouping the transmit queues at (Continued)

```
                                                    ┌─ S402
┌──────────────────────────────────────────────┐
│  Determine a priority value of each transmit queue │
└──────────────────────────────────────────────┘
                     │
                     ▼                              ┌─ S404
┌──────────────────────────────────────────────┐
│  Divide the transmit queues at the station into a first group of │
│  transmit queues and a second group of transmit queues │
│         according to the access category       │
└──────────────────────────────────────────────┘
                     │
                     ▼                              ┌─ S406
┌──────────────────────────────────────────────┐
│  Select data packets from a plurality of transmit queues │
│  according to a manner that the first group of transmit queues is │
│  prioritized over the second group of transmit queues and │
│  transmit queues in the same group have a descending order of │
│  the priority value, so that a total length of the selected data │
│  packet does not exceed the maximum length limit │
└──────────────────────────────────────────────┘
                     │
                     ▼                              ┌─ S408
┌──────────────────────────────────────────────┐
│  Until all the transmit queues are traversed, or the number of │
│  traffic identifiers of the selected transmit queues is equal to the │
│         traffic identifier aggregation limit   │
└──────────────────────────────────────────────┘
``` the station according to an access category of each transmit queue; and selecting the transmit queues and the data packets in the transmit queues according to a selection policy with respect to the transmit queues that are sorted according to the priority value.

20 Claims, 8 Drawing Sheets

(51) Int. Cl.
    *H04W 28/02*           (2009.01)
    *H04W 84/12*           (2009.01)

(58) Field of Classification Search
    CPC ............. H04W 84/12; H04W 72/1268; H04W 72/569; H04W 72/21; H04W 72/23; Y02D 30/70
    See application file for complete search history.

(56)             References Cited

U.S. PATENT DOCUMENTS

| | | | |
|---|---|---|---|
| 2018/0176929 A1* | 6/2018 | Ryu ...................... | H04W 72/56 |
| 2023/0254742 A1* | 8/2023 | Liu ....................... | H04W 48/16 |
| | | | 455/436 |

\* cited by examiner

S202

Receive, by the station, a trigger frame from the access point

S204

Select one or more data packet from a plurality of transmit queues at the station based on the trigger frame

S206

Aggregate the selected data packets into an A-MPDU

S208

Transmit the A-MPDU to the access point

| Priority | Access category (AC) | Traffic identifier (TID) |
|---|---|---|
| High ↓ Low | AC_VO (voice) | TID-7, TID-6 |
| | AC_VI (video) | TID-5, TID-4 |
| | AC_BE (best effort) | TID-3, TID-0 |
| | AC_BK (background) | TID-2, TID-1 |

FIG. 3

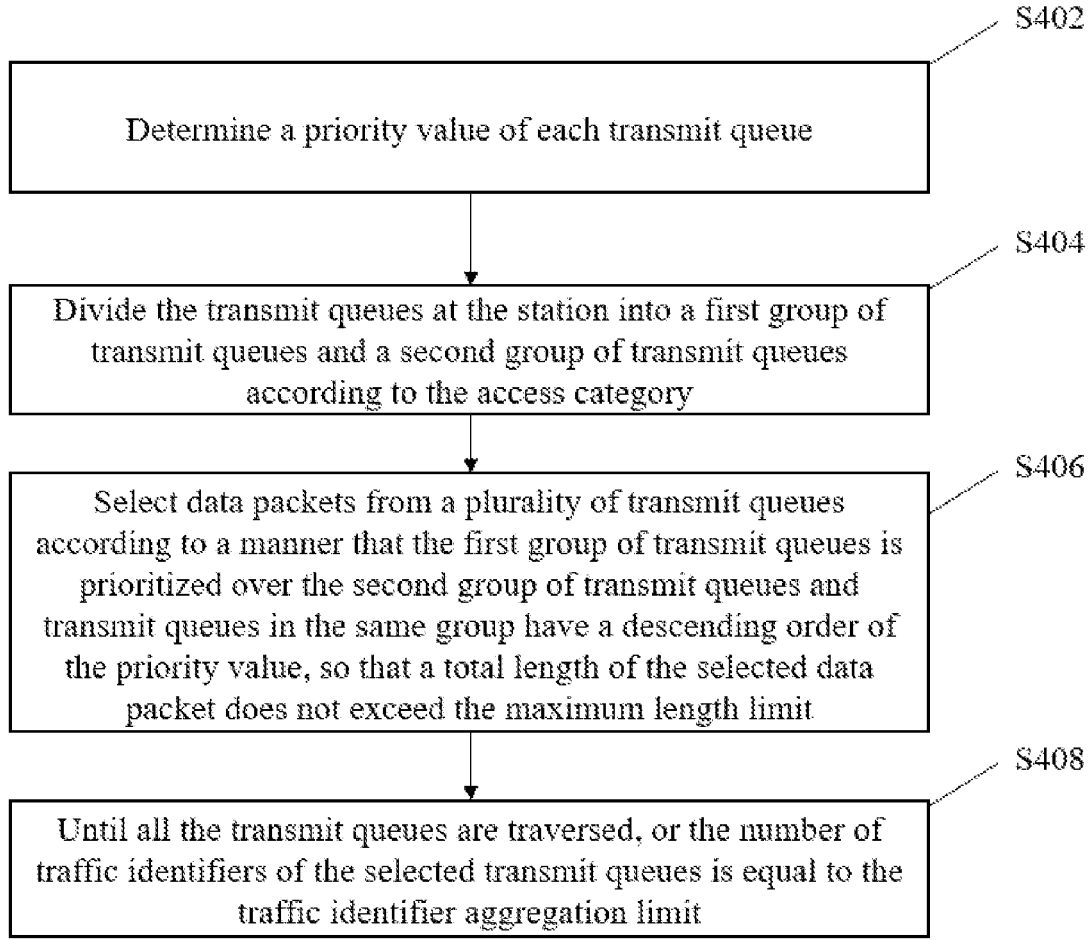

Determine a priority value of each transmit queue

S402

Divide the transmit queues at the station into a first group of transmit queues and a second group of transmit queues according to the access category

S404

Select data packets from a plurality of transmit queues according to a manner that the first group of transmit queues is prioritized over the second group of transmit queues and transmit queues in the same group have a descending order of the priority value, so that a total length of the selected data packet does not exceed the maximum length limit

S406

Until all the transmit queues are traversed, or the number of traffic identifiers of the selected transmit queues is equal to the traffic identifier aggregation limit

UPLINK TRANSMISSION METHOD IN WIRELESS LOCAL AREA NETWORK (WLAN) AND STATION DEVICE

CROSS-REFERENCE TO RELATED APPLICATIONS

This application is the U.S. National Phase application under 35 U.S.C. § 371 of International Patent Application No. PCT/CN2021/143717 filed on Dec. 31, 2021, which claims priority to Chinese Patent Application CN202110198239.4 filed on Feb. 23, 2021. The disclosures of the aforementioned applications are hereby incorporated by reference in their entireties.

TECHNICAL FIELD

The disclosure relates to the technical field of wireless local area network (WLAN), in particular to an uplink transmission method operated by a station (STA) for transmitting data to an access point (AP) in a wireless local area network (WLAN) and a station device executing the uplink transmission method.

BACKGROUND

With the continuous development of wireless communications, requirements for data rate and quality of service in communication protocols have gradually increased (e.g., from IEEE 802.11a/g to IEEE 802.11n to IEEE 802.11ax). 802.11e protocol defines a set of channel competition mechanism EDCA (Enhanced Distributed Channel Access), which is conducive to high-priority traffic data to enjoy the right to be transmitted with priority and more bandwidth. The EDCA mechanism divides different traffic transmissions into four access categories (ACs), to ensure that high-priority traffic data stream has priority access to the channel, thereby ensuring that applications such as voice, video, etc., have better quality in the wireless network. According to the access category allocated to the traffic data stream, it is divided into four priority queues, namely AC_VO (voice), AC_VI (video), AC_BE (best effort), and AC_BK (background), according to a descending order of priority, so as to ensure that traffic data of the high-priority category preempts a wireless channel to proceed with transmission. In addition, starting with IEEE 802.11n, the concept of QoS (quality of service) is proposed, which defines 8 traffic identifiers (Traffic IDs, or TIDs). These 8 traffic identifiers are mapped to 4 access categories, which are used to indicate the priority of transmitting data. In the station (STA), transmit queues (TX queues) are maintained, and priorities of the TX queues are different. Each of the transmit queues is assigned with a traffic identifier to indicate the corresponding priority.

802.11ax has a major change in its MAC layer compared to the legacy 802.11 protocol. The basic idea of 802.11ax has gradually changed from emphasizing distributed scenarios to emphasizing centralized, high-density and optimized resource allocation. Multi-user transmissions in 802.11ax are based on OFDMA technology, which is used to increase the throughput rate. In its uplink transmission (UL-OFDMA) or downlink transmission (DL-OFDMA), the access point (AP) is required to utilize a trigger frame to realize the exchange of scheduling information between multi-user communications. The trigger frame is also used to realize the exchange of frames between user MU-MIMO. The trigger frame contains multiple subtypes, which provide many important functions in 802.11 ax. Commonly used subtypes of the trigger frame include a basic trigger frame which is used to trigger a node for parallel uplink transmission, a buffer status report poll (BSRP) frame which is used to request a buffer status of a terminal, and an MU-RTS frame which is used for compatibility and protection of the legacy 802.11 terminal as well as allocation of RU resources, and the like.

802.11ax introduces a new data transmission mechanism, i.e., uplink data transmission based on the trigger frame, to improve the throughput rate. Referring to FIG. 1, a typical application scenario is illustrated, where an access point first sends a BSRP trigger frame to a station to collect buffer information of transmit queues inside the station. After receiving the BSRP trigger frame, the station returns a TB PPDU to the access point, where the TB PPDU includes buffer information of each transmit queue at the station. The access point then sends an AMPDU to the station, and in addition to the QoS data frame, the AMPDU aggregates a basic trigger frame. In the basic trigger frame, the following two parameters are mainly defined: a preferred access category and a traffic identifier aggregation limit. The preferred access category indicates the access category of the lowest priority corresponding to the QoS data that the access point wants the station to reply to, and the traffic identifier aggregation limit indicates the maximum number of different traffic identifiers that can be included in the QoS data replied by the station. After receiving the AMPDU of the access point, the station also returns an AMPDU to the access point. The AMPDU first carries a block ACK (BA) frame to confirm QoS data sent from the access point to the station, and carries one or more data packets in the transmit queues to the access point according to the requirement of the basic trigger frame. According to the 802.11 ax protocol or the compatible protocols, data packets in the queue may be aggregated as subframes into the AMPDU.

Since the basic trigger frame defined in the 802.11 ax protocol specifies a total length of the physical layer protocol data unit (TB PPDU) that is based on the trigger frame and that the access point subsequently wishes to receive from the station, it is not possible for the station to return data packets in all the transmit queues to the access point, which introduces the problem of how to select the transmit queue. The protocol sets only basic rules for selecting the queue, that is, defines two parameters: a preferred AC and a TID aggregation limit. According to the requirement of the trigger frame, the station should give priority to return data packets in the preferred AC queue. If the current station does not have data packets in the preferred AC queue that need to give priority to return, a data packet in a queue whose access category is lower than the priority access category may be added to the TB PPDU. For how to specifically select data packets from different transmit queues, no corresponding specification is given in the protocol. This disclosure aims to propose a solution to the problem of how to select a transmit queue and a data packet after the station receives the basic trigger frame.

The inventors note that although various data packet aggregation and scheduling transmission schemes have been proposed in the existing art for uplink data transmission based on trigger frames, these existing schemes mainly focus on solving communication scheduling between the access point and the station, and improving resource utilization efficiency, but do not optimize the data priority and the selection manner for the transmit queues at the station, and do not improve transmitting efficiency on the premise of ensuring fairness.

For example, U.S. patent application publication US20190173625A1 discloses a station, an access point, and a method of aggregating data packets. The access point may send a trigger frame to the station, and the trigger frame indicates an access category constraint parameter and a traffic identifier aggregation limit parameter. The station may select a set of aggregated traffic identifiers from which a media access control (MAC) protocol data unit (MPDU) may be aggregated into an aggregated MPDU (A-MPDU). The access category constraint parameter may indicate a preferred access category from which to select at least a portion of the aggregate traffic identifier. The traffic identifier aggregation limit parameter may indicate the number of TIDs to be selected for a group of aggregated TIDs. The patent application generally discloses a method of aggregating the MPDU into the aggregated MPDU (A-MPDU), which aggregates the MPDU with multiple access category parameters and multiple traffic identifiers into the multi-traffic identifier A-MPDU based primarily on the traffic identifier aggregation limit parameter and the access category constraint parameter, and is used for transmission in a TB PPDU. In the patent disclosure, the MPDU aggregation method is designed only for the multi-access category parameter and the multi-traffic identifier, and the problem of how to select a data packet among the various transmit queues in the station is not considered and solved.

As another example, U.S. patent application publication US20160330753A1 discloses a method of performing OFDMA transmission using aggregation from multiple access categories to improve channel utilization of the wireless channel. The method allows data of multiple access categories to be aggregated and transmitted in the same group to efficiently utilize idle time. In downlink OFDMA, an access point may send data of different access categories to different stations, which allows for better scheduling of transmission resource blocks. If a resource at a station has sufficient idle time, the access point may aggregate more data of different current access categories for the same station to better utilize the resource. In uplink OFDMA, different stations may send data of different access categories to the access point. If a station's resource has sufficient idle time, the station may aggregate more data of different current access categories to better utilize the resource. This patent application mainly addresses efficient utilization of a resource unit (RU) and effective utilization of an idle timeslot in uplink/downlink OFDMA, but does not consider and solve the problem of selecting transmitting queue and data packet at the station during the uplink transmission process.

To sum up, there is a need in the existing art for an uplink transmission method operated by a station for transmitting data to an access point in a wireless local area network (WLAN) and a station device executing the uplink transmission method, which is capable of selecting a transmit queue fairly and maintaining a balanced throughput rate of each transmit queue during the uplink transmission process on the premise of ensuring that a priority requirement is met, so as to solve the above problems in the existing art. It should be understood that the foregoing listed technical problems are merely examples rather than limiting the present disclosure, and the present disclosure is not limited to technical solutions that simultaneously solve all the foregoing technical problems. The technical solutions of the present disclosure may be implemented to solve one or more of the foregoing or other technical problems.

SUMMARY

Aiming at the above problems, it is an object of the present invention to provide an uplink transmission method operated by a station for transmitting data to an access point in a wireless local area network (WLAN) and a station device executing the uplink transmission method, which is capable of selecting a transmit queue fairly and maintaining a balanced throughput rate of each transmit queue during the uplink transmission process on the premise of ensuring that a priority requirement is met, in view of a length limitation and a priority limitation at the station in response to a triggering frame for returning a TB PPDU to the access point.

In one aspect of the present disclosure, it is provided an uplink transmission method operated by a station (STA) for transmitting data to an access point (AP) in a wireless local area network (WLAN), the method including:

receiving, by the station, a trigger frame from the access point, the trigger frame including a maximum length limit, a preferred access category and a traffic identifier aggregation limit of an allowed aggregated media access control protocol data unit (A-MPDU), wherein the traffic identifier aggregation limit is configured to identify a maximum number of traffic identifiers allowed to be aggregated by the A-MPDU; and selecting, based on the trigger frame, one or more data packets from a plurality of transmit queues at the station and aggregating them into the A-MPDU to proceed with transmission to the access point, wherein each of the plurality of transmit queues has an access category and a traffic identifier, and each transmit queue includes zero, one or more data packets; wherein selecting one or more data packets from the plurality of transmit queues includes steps of: determining a priority value for each of the transmit queues; grouping the transmit queues at the station having an access category priority higher than or equal to a priority of the preferred access category into a first group of transmit queues, and grouping the transmit queues at the station having an access category priority lower than the priority of the preferred access category into a second group of transmit queues, according to an access category of each transmit queue; and selecting data packets from each of the plurality of transmit queues in a manner that the first group of transmit queues is prioritized over the second group of transmit queues and the transmit queues in the same group are sorted in descending order of priority value, such that a total length of the selected data packets does not exceed the length limit of the data packet until all of the transmit queues are traversed or the number of traffic identifiers of the selected transmit queues is equal to the traffic identifier aggregation limit.

Optionally, the step of selecting data packets from each of the plurality of transmit queues includes: polling a first data packet in each of the plurality of transmit queues in a traversal manner, then polling a second data packet in each of the plurality of transmit queues in a traversal manner, until the last data packet in each of the plurality of transmit queues has been polled in a traversal manner.

Preferably, the step of selecting data packets from each of the plurality of transmit queues includes: during polling the data packets in each of the plurality of transmit queues in sequence, in response to selecting a data packet in a present transmit queue is going to cause the total length of the selected data packets to exceed the length limit of the data packet, deleting the present transmit queue or skipping the present transmit queue in a subsequent polling.

Optionally, each of the plurality of transmit queues at the station further includes EDCA parameters, and the EDCA parameters at least include a backoff inter-frame interval time (AIFS) and a backoff_timer.

Optionally, the priority value of the transmit queue is obtained by weight calculation of a buffer length and the EDCA parameter of each of the plurality of transmit queues at the station.

Preferably, the priority value is calculated by below formula: Priority value=$w_1$*(bsr_info/factor)–$w_2$*(AIFS [AC]+backoff_timer*aSlottime), wherein bsr_info is a buffer length of each transmit queue; factor is a parameter that converts the buffer length of each transmit queue into a contention window time; AIFS [AC] is the backoff inter-frame interval time of each transmit queue corresponding to the access category of the present transmit queue; backoff_timer is the backoff inter-frame interval time that identifies the number of time slots contended by each transmit queue; aSlottime is a time length of a time slot; weight coefficient $w_1$ is a non-negative integer; and weight coefficient $w_2$ is a positive integer.

Optionally, the uplink transmission method further includes: storing a length of one or more data packets in each of the plurality of transmit queues at the station by using a linked list, the linked list storing an address of a first data packet in each transmit queue; and obtaining a length of each of other data packets in each transmit queue by looking up the linked list.

In another aspect of the present disclosure, it is provided a station (STA) device configured to transmit data to an access point (AP), the station device including: a receiving module, a memory and a decision circuit coupled to the receiving module and the memory respectively; wherein, the receiving module is configured to receive a trigger frame from the access point and decode the trigger frame to obtain a maximum length limit, a preferred access category and a traffic identifier aggregation limit of an allowed aggregated media access control protocol data unit (A-MPDU), wherein the traffic identifier aggregation limit is configured to identify a maximum number of traffic identifiers allowed to be aggregated by the A-MPDU; the memory is configured to include a buffer for a plurality of transmit queues, wherein each of the plurality of transmit queues has an access category and a traffic identifier, and each transmit queue includes zero, one or more data packets; and the decision circuit is configured to: obtain a maximum length limit, a preferred access category and a traffic identifier aggregation limit of a trigger frame from the receiving module; and select one or more data packets from the plurality of transmit queues and aggregate them into an A-MPDU to proceed with transmission to the access point; wherein selecting one or more data packets from the plurality of transmit queues includes steps of: grouping the transmit queues having an access category priority higher than or equal to a priority of the preferred access category into a first group of transmit queues, and grouping the transmit queues having an access category priority lower than the priority of the preferred access category into a second group of transmit queues, according to the access category of each transmit queue; and selecting data packets from each of the plurality of transmit queues in a manner that the first group of transmit queues is prioritized over the second group of transmit queues and the transmit queues in the same group are sorted in descending order of priority value, such that a total length of the selected data packets does not exceed the length limit of the data packet until all of the transmit queues are traversed or the number of traffic identifiers of the selected transmit queues is equal to the traffic identifier aggregation limit.

Optionally, the decision circuit is configured to select one or more data packets from the plurality of transmit queues at the station and aggregate them into the A-MPDU.

Optionally, the station device further includes a length buffer module configured to: store a length of one or more data packets in each transmit queue by using a linked list, the linked list storing an address of a first data packet in each transmit queue; and obtain a length of each of other data packets in each transmit queue by looking up the linked list.

Optionally, the decision circuit is coupled to the length buffer module, and the decision circuit is configured to read the length of one or more data packets in each transmit queue from the length buffer module.

Optionally, the station device further includes a length calculation module coupled to the memory, and the length calculation module is configured to calculate a total length of the data packets selected from the plurality of transmit queues.

Optionally, the priority value of the transmit queue is obtained by weight calculation of a buffer length (bsr_info) and the EDCA parameters of each of the plurality of transmit queues at the station.

In still another aspect of the present disclosure, it is provided a computer-readable storage medium storing a computer program thereon which, when executed by a processor, causes the processor to implement steps of the above uplink transmission method.

The present disclosure optimizes the data priority and the selection method for the transmit queues at the station, provides an implementation of a selection strategy that can improve the transmission efficiency and maintain a balanced throughput rate of the individual transmit queues, while ensuring fairness. In addition, the present disclosure proposes improvements to the hardware design to obtain selection results faster and to meet the speed requirements of communication.

It should be understood that the foregoing description of the background as well as the summary of the disclosure is merely schematic and not limiting.

BRIEF DESCRIPTION OF THE DRAWINGS

FIG. 3 is a schematic diagram of an access category and a traffic identifier according to an embodiment of the present disclosure.

FIG. 4 is a schematic flowchart of selecting a transmit queue and a data packet at a station in a method operated by the station for transmitting data to an access point according to an embodiment of the present disclosure.

DETAILED DESCRIPTION OF THE PREFERRED EMBODIMENTS

The present disclosure will be described more fully hereinafter with reference to the accompanying drawings, which form part of the disclosure of the present invention and illustrate exemplary embodiments by way of illustration. It should be understood that the embodiments shown in the accompanying drawings and described hereinafter are merely illustrative and are not intended to limit the present disclosure.

Figure 1:
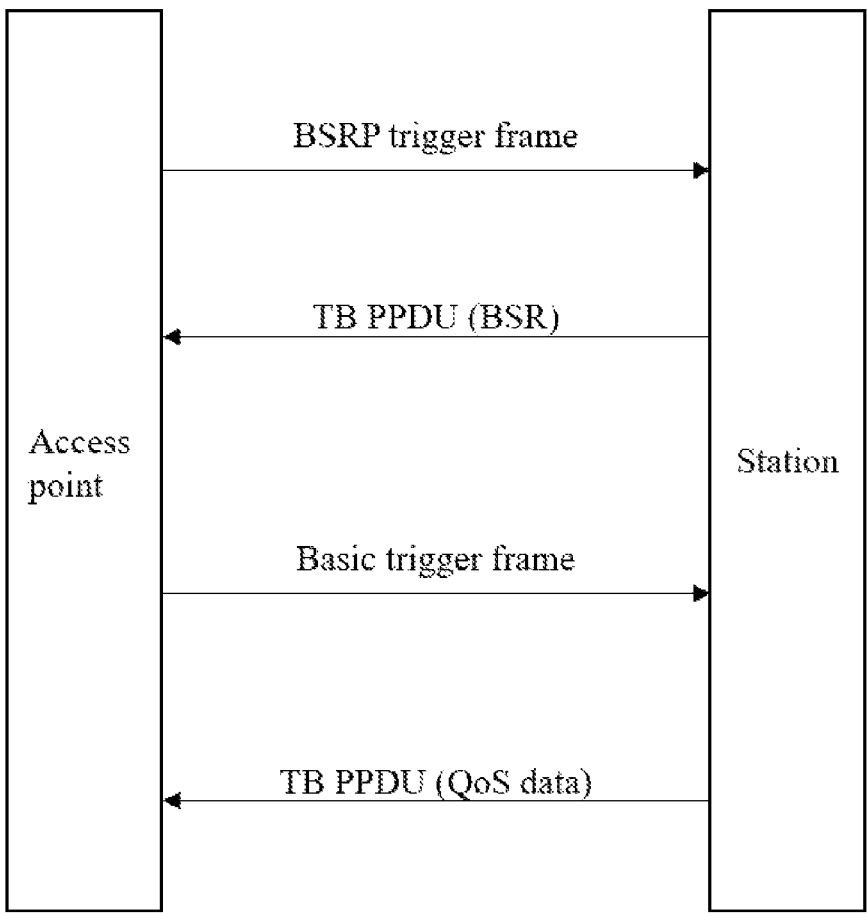
FIG. 1 is a schematic flowchart of a trigger frame-based uplink data transmission mechanism in the 802.11 ax protocol.
Figure 2:
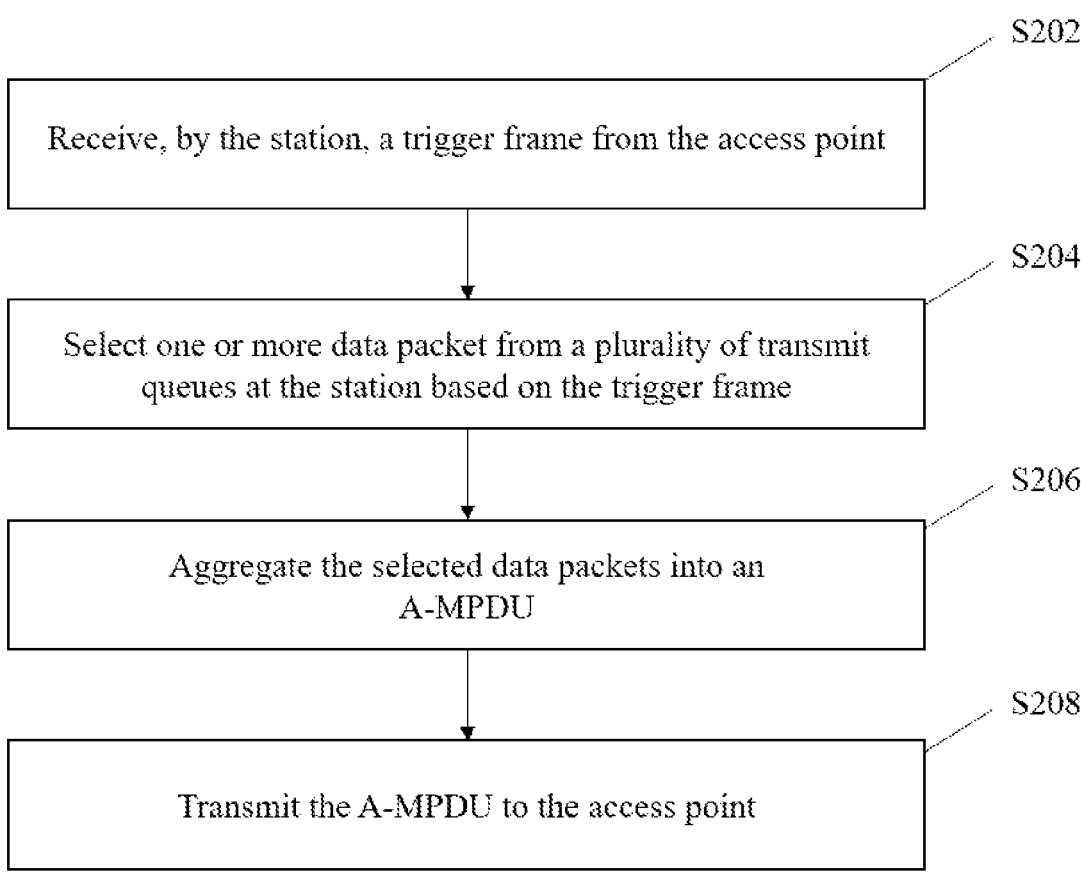
FIG. 2 is a schematic flowchart of a method operated by a station for transmitting data to an access point in a wireless local area network (WLAN) according to an embodiment of the present disclosure.

FIG. 2 is a schematic flowchart of a method operated by a station for transmitting data to an access point in a WLAN according to an embodiment of the present disclosure. As shown in FIG. 2, the method includes the following steps.

At S202, the station receives a trigger frame from the access point.

At S204, one or more data packets are selected from a plurality of transmit queues at a station based on the trigger frame.

At S206, the selected data packets are aggregated into an A-MPDU.

At S208, the A-MPDU is transmitted to the access point.

It should be understood that, at the step S202, the trigger frame received from the access point includes a maximum length limit, a preferred access category, and a traffic identifier aggregation limit of an allowed aggregated media access control protocol data unit (A-MPDU), wherein the traffic identifier aggregation limit is configured to identify the maximum number of traffic identifiers allowed to be aggregated by the A-MPDU.

It should be understood that the station has a plurality of transmit queues, each transmit queue is provided with an access category and a traffic identifier, and each transmit queue includes zero, one or more data packets. By way of example but not limitation, the access category and the traffic identifier of the transmit queue may be implemented by software configuration. By way of example and not limitation, the transmit queue further possesses other related parameters, such as a EDCA parameter. For example, the EDCA parameter of each transmit queue may further include a backoff inter-frame space time (AIFS) and a backoff timer (backoff_timer).

It should be understood that access categories of the transmit queue are classified as AC_VO (voice), AC_VI (video), AC_BE (best effort), and AC_BK (background) in descending order of priority, to represent the priority of preempting the wireless channel and transmitting data by the transmit queue. It should be understood that the traffic identifiers are mapped to 4 access categories to indicate a priority of transmitting data. The specific mapping relationship is shown in FIG. 3.

In the method shown in FIG. 2, the specific selection strategy of step S204 is exemplarily given by FIG. 4. FIG. 4 is a schematic flowchart of selecting a transmit queue and a data packet at a station in a method operated by the station for transmitting data to an access point according to an embodiment of the present invention. As shown in FIG. 4, the method includes the following steps.

At S402, a priority value of each transmit queue is determined.

At S404, the transmit queues at the station are divided into a first group of transmit queues and a second group of transmit queues according to the access category.

At S406, data packets are selected from a plurality of transmit queues according to a manner that the first group of transmit queues is prioritized over the second group of transmit queues and transmit queues in the same group have a descending order of the priority value, so that a total length of the selected data packet does not exceed the maximum length limit.

At S408, until all the transmit queues are traversed, or the number of traffic identifiers of the selected transmit queues is equal to the traffic identifier aggregation limit.

By way of example and not limitation, at step S402, the priority value of the transmit queue is obtained by weight calculation of the buffer length and the EDCA parameter of each transmit queue at the station. The formula for calculating the priority value is:

$$\text{Priority value} = w_1 * (\text{bsr\_info}/\text{factor}) - w_2 * (\text{AIFS}[\text{AC}] + \text{backoff\_timer} * \text{aSlottime}),$$

Where bsr_info is the buffer length of each transmit queue, factor is a parameter that converts the buffer length of each transmit queue into a contention window time, AIFS[AC] is the backoff inter-frame interval time of each transmit queue corresponding to an access category of the transmit queue, backoff_timer is the backoff inter-frame interval time that identifies the number of time slots contended by each transmit queue, aSlottime is a time length of a time slot, weight coefficient $w_1$ is a non-negative integer, and weight coefficient $w_2$ is a positive integer.

It should be understood that, at step S404, when grouping the transmit queues at the station, the transmit queues at the station with an access category priority higher than or equal to the priority of the preferred access category are grouped into the first group of transmit queues, and the transmit queues with an access category priority lower than the priority of the preferred access category are grouped into the second group of transmit queues.

It should be understood that, at step S406, when the data packet is selected from the plurality of transmit queues, the total length of the selected data packet does not exceed the length limit of data packet specified in the trigger frame. By way of example and not limitation, at step S406, when data packets of each of the plurality of transmit queues are sequentially polled, if selecting a data packet in a present transmit queue causes a total length of the selected data packet to exceed the length limit of data packet, the transmit queue is deleted or the transmit queue is skipped during subsequent polling.

By way of example and not limitation, at step S406, a first data packet in each of the plurality of transmit queues is sequentially polled in a traversal manner, and then a second data packet in each transmit queue is sequentially polled until a last data packet in each transmit queue is polled sequentially.

One of the common approaches for selecting data in the existing art is to select the transmit queue according to a preferred access category, which results in that as long as a certain transmit queue of high priority has a data packet, the transmit queue is always scheduled to transmit data, while the other transmit queues can only wait. This approach may lead to a situation where the throughput rate of the transmit queues is severely unbalanced. Another common approach for selecting data in the existing art is to select a transmit queue in a polling manner, that is, to select a first data from each of the transmit queues and a second data from each of the transmit queues sequentially until the end of data selection. Although this approach can solve the problem that the transmit queue of high priority keeps occupying the channel for transmitting data, the priority of the transmit queue will be destroyed, and the final implementation effect is that all the transmit queues are of the same priority. In contrast, the present disclosure first groups the transmit queues according to the access categories to form a first group of transmit queues and a second group of transmit queues, and sorts priority values in each of the first group of transmit queues and the second group of transmit queues. For each of the sorted transmit queues, the transmit queues in the first group and the second group are sequentially polled in a traversal manner, and data packets that comply with the maximum length limit and the traffic identifier aggregation limit are sequentially selected. This method ensures relative prioritization among the individual transmit queues to improve transmitting efficiency, while maintaining a balanced throughput rate among the individual queues.

Figure 5:
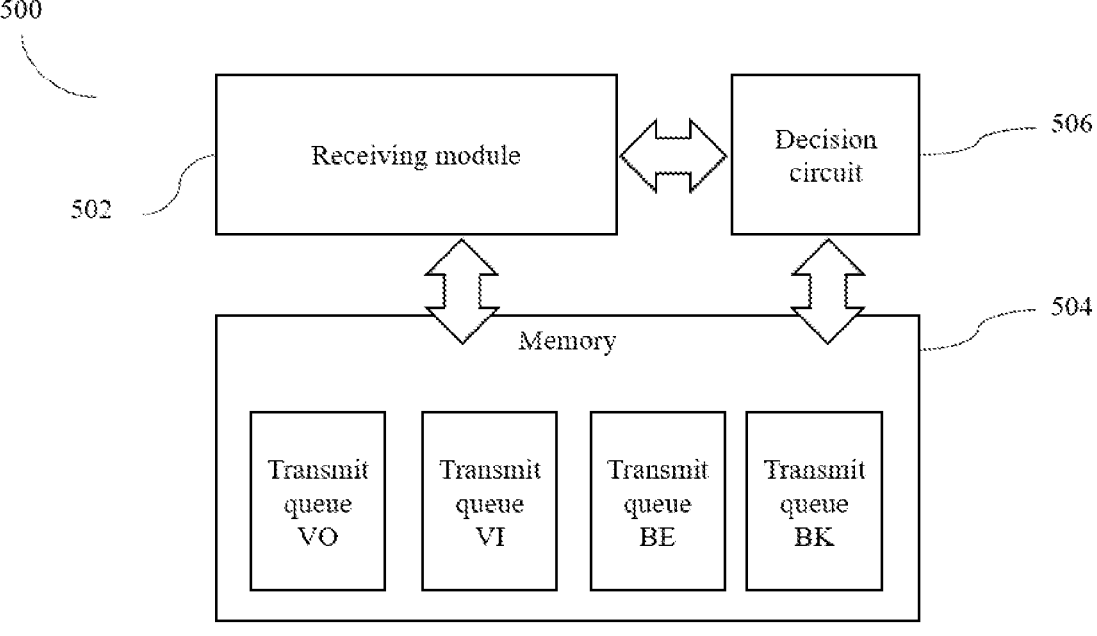
FIG. 5 is a block diagram of a station device 500 according to an embodiment of the present disclosure.

FIG. 5 illustrates a station (STA) device 500 in an embodiment. As shown in FIG. 5, the station device 500 is configured to transmit data to an access point (AP), and the station device includes a receiving module 502, a memory 504 and a decision circuit 506, and the decision circuit 506 is coupled to the receiving module 502 and the memory 504 respectively. The receiving module 502 is configured to receive a trigger frame from the access point and decode the trigger frame to obtain a maximum length limit, a preferred access category, and a traffic identifier aggregation limit of an allowed aggregated media access control protocol data unit (A-MPDU). The memory 504 is configured to include a buffer of a plurality of transmit queues, wherein each of the plurality of transmit queues has an access category and a traffic identifier. The decision circuit 506 is configured to: (1) obtain the maximum length limit, the preferred access category and the traffic identifier aggregation limit of the trigger frame from the receiving module, and (2) select one or more data packets from the plurality of transmit queues and aggregate them into an A-MPDU to proceed with transmission to the access point.

Figure 6:
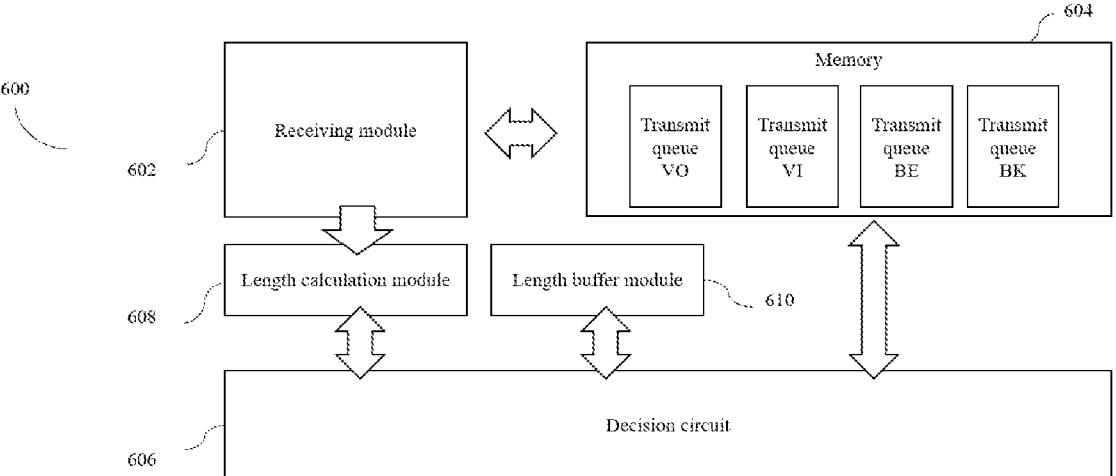
FIG. 6 is a block diagram of a station device 600 according to another embodiment of the present disclosure.

As an optional embodiment, FIG. 6 illustrates a station (STA) device 600 in an embodiment. As shown in FIG. 6, the station device 600 is configured to transmit data to an access point (AP), and the station device includes a receiving module 602, a memory 604, a decision circuit 606 and a length calculation module 608 and a length buffer module 610. The decision circuit 606 is coupled to the receiving module 602, the memory 604, the length calculation module 608 and the length buffer module 610 respectively. The length calculation module 608 is configured to calculate a total length of the data packet selected from the plurality of transmit queues, and the length buffer module 610 is configured to store the length of the one or more data packets of each transmit queue via a linked list. However, it should be understood that the implementation of the present disclosure is not limited thereto. The components of the station device of the present disclosure may be connected to each other in different ways.

By way of example and not limitation, the decision circuit 506 or the decision circuit 606 may be implemented as a sequencing circuit implemented by hardware, or one or more application-specific integrated circuits (ASICs), or a field programmable logic gate array (FPGA).

Figure 7:
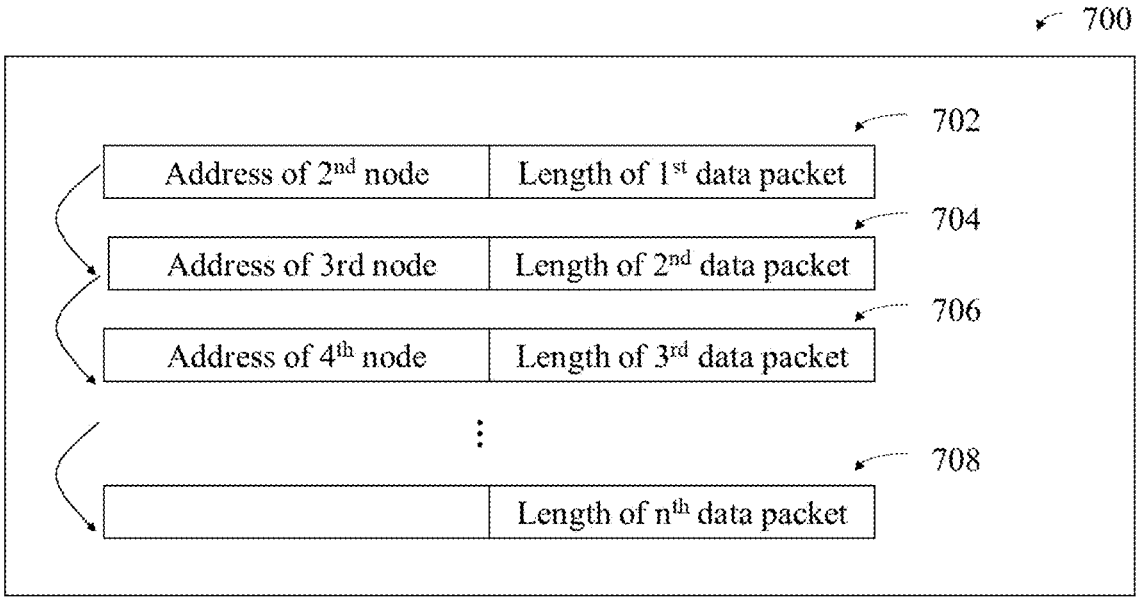
FIG. 7 is a schematic structural diagram of a linked list buffer of a length buffer module according to an embodiment of the present disclosure.

By way of example and not limitation, referring to FIG. 7, the length buffer module 610 is configured to store the length of the data packet in the transmit queue by using a linked list 700. As shown in FIG. 7, the linked list 700 includes a node 702, a node 704, a node 706, a node 708, etc., and each node includes a length information of a data packet and an address of the next node. The process of looking up the linked list is to first provide a start address of the first node by which the length of the first data packet can be read, and an address of the second node. The address of the second node is then used to look up the length of the second data packet, and so on, so that the entire linked list can be traversed. As a non-limiting example, the length buffer module 610 may be implemented as a static random access memory (SRAM). The decision circuit may read the length information in the buffer directly to quickly complete the decision process. It should be understood that the implementation of the present disclosure is not limited thereto, for example, the memory may be implemented as a volatile memory such as a random access memory (RAM), DRAM, SDRAM, SDRAM, PSRAM, etc., or as a non-volatile memory such as a flash memory, a read-only memory (ROM), PROM, EPROM, OTPROM, EEPROM, etc.

Figure 8:
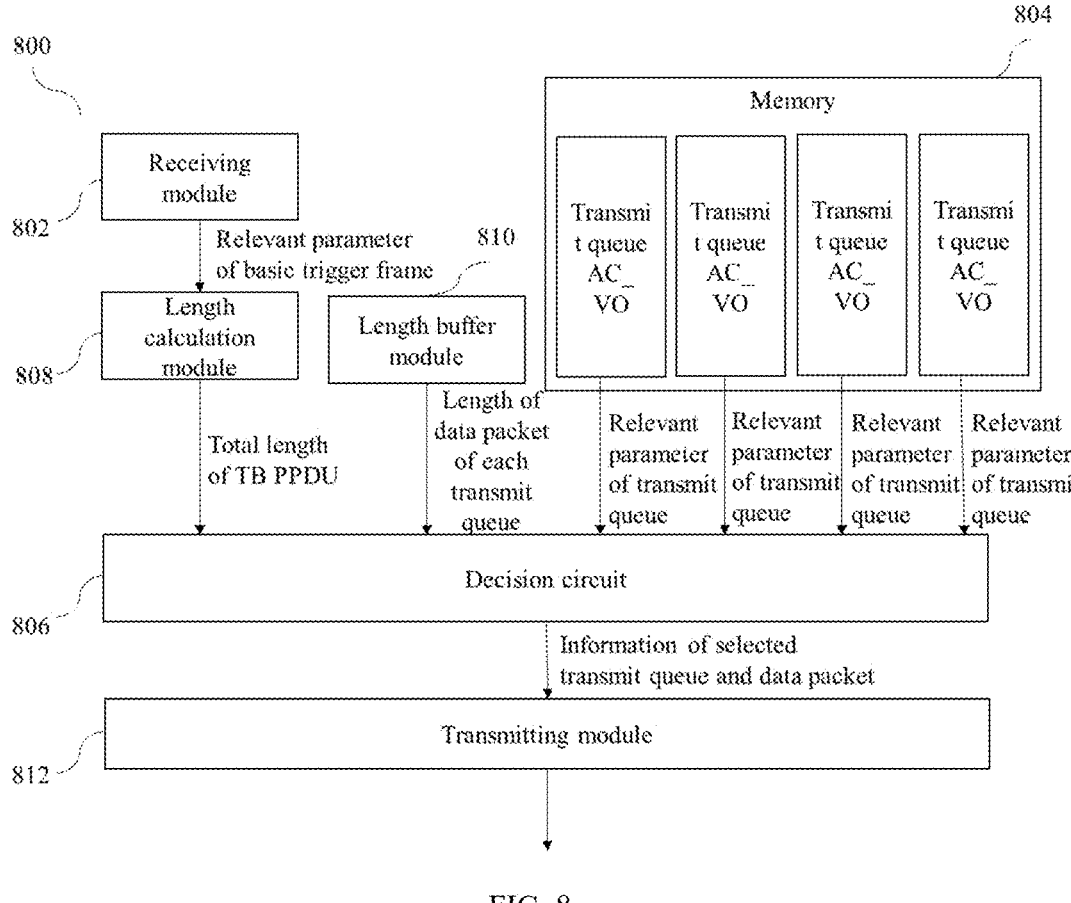
FIG. 8 is a block diagram of a station device 800 according to still another embodiment of the present disclosure.

As an alternative embodiment, FIG. 8 illustrates a block diagram of a station (STA) device 800 in an embodiment. As shown in FIG. 8, the station device 800 includes a receiving module 802, a memory 804, a decision circuit 806, a length calculation module 808 and a length buffer module 810, as well as a transmitting module 812. The main workflow of the station device is as follows.

(1) The relevant parameters of the transmit queue buffered in the memory 804 and the relevant information in the length buffer module 810 may be configured by software, so that the transmitting module 812 can operate.

(2) The receiving module 802 of the station device receives a basic trigger frame from the access point and parses the parameters related to the total length of the TB PPDU (e.g., the maximum length limit, etc.) from the basic trigger frame, and transmits these parameters to the length calculation module 808.

(3) The length calculation module 808 calculates the total length of the TB PPDU according to the relevant parameters provided by the receiving module 802, and transmits the total length to the decision circuit 806.

(4) The decision circuit 806, according to the total length of the TB PPDU and the relevant parameters of the transmit queue, reads the length of the data packet in each transmit queue in the length buffer module 810 to decide on the data packet to be selected for placing in the TB PPDU, and transmits the address of the selected data packet to the transmitting module 812.

(5) The transmitting module 812 obtains the corresponding data packet from the transmitting queue according to the specific content provided by the decision circuit 806, encapsulates the same into a TB PPDU to proceed with transmission.

The present disclosure adopts a hardware architecture to implement the trigger frame-based transmit data selection function, which can reduce the system's requirement for CPU processing capability compared to common software implementations. According to the 802.11ax protocol, the station device needs to return the TB PPDU to the access point within a short inter-frame interval SIFS time (usually 16 µs) after receiving the trigger frame, and 16 µs is a big bottleneck for CPUs with weaker processing capability, which can be solved by using the hardware circuitry processing of the present disclosure. In addition, the workflow of the length calculation and decision circuit of the present disclosure is relatively fixed and the algorithm is relatively simple, thus suitable for hardware implementation.

According to a non-limiting embodiment of the present disclosure, in the main workflow, the relevant parameters of the transmit queue may include AIFS[AC], CWmin[AC], CWmax[AC], CW[AC], a backoff_timer, and bsr_info, specifically:

AIFS[AC] indicates the backoff inter-frame interval in the unit of μs for the access category corresponding to the transmit queue;

CWmin[AC] denotes the minimum contention window of the AC corresponding to the transmit queue, which is a positive integer;

CWmax[AC] denotes the maximum contention window of the AC corresponding to the transmit queue, which is a positive integer;

CW[AC] is equal to CWmin[AC] when transmitting for the first time; if transmitting fails, CW[AC] needs to be updated; the updating process is as follows: if (CW[AC]+1)*2−1 is less than or equal to CWmax[AC], then the updated CW[AC] is equal to (CW[AC]+1)*2−1, otherwise, the updated CW[AC] is equal to CWmax[AC];

backoff_timer denotes the number of time slots for contention, the initial value is a random positive integer between 0 and CW[AC], and the backoff_timer is decremented by 1 for each time slot passed during the contention;

aSlottime denotes a time length of a time slot, with a typical value of 9 μs;

bsr_info denotes the amount of data buffered in the current transmit queue in a unit of byte;

factor denotes a parameter that converts the amount of data buffered in the transmit queue into a contention window time in a unit of byte/μs. For example, if factor=1,024 byte/μs, bsr_info=4,500 bytes, then the contention window time obtained by converting bsr_info is 4 μs. The unit conversion can be performed by rounding down to an integer to obtain the contention window time.

According to a non-limiting embodiment of the present disclosure, in the main workflow, the decision circuit 706 reads the length of the data packet in each transmit queue in the length buffer module 710 according to the total length of the TB PPDU and the relevant parameters of the transmit queue, to decide on the data packet to be selected and placed into the TB PPDU. The specific process of selecting the data packet is as follows.

At step 1, a priority value is calculated for each transmit queue, and the formula for calculating the priority value is: priority value=$w_1$*(bsr_info/factor)−$w_2$*(AIFS[AC]+backoff_timer*aSlottime), wherein the weight coefficient $w_1$ is a non-negative integer, and the weight coefficient $w_2$ is a positive integer, which may be configured by software. When $w_1$ is 0, it means that the priority is determined only by the EDCA parameter. The final calculated priority value is an integer, which can be a positive integer or a negative integer, and the larger the priority value, the higher the priority.

At step 2, all the transmit queues are divided into two groups according to the access category, a first group of the transmit queues all have a priority of the access category higher than or equal to the priority of the preferred access category of the basic trigger frame, and a second group of the transmit queues all have a priority of the access category lower than the priority of the preferred access category of the basic trigger frame.

At step 3, the first group of transmit queues is sorted in order of the priority value of each transmit queue in descending order and denoted as Q_h, and the second group of transmit queues is sorted in order of the priority value of each transmit queue in descending order and denoted as Q_l.

At step 4, a length of data packet in each transmit queue in the length buffer module 710 is read according to the total length of the TB PPDU and the relevant parameters of the transmit queues, the relevant transmit queue is selected to be placed into the TB PPDUs, with the selected set of transmit queues denoted as Q_sel, and the data packets from the respective selected transmit queues are obtained.

Figure 9:
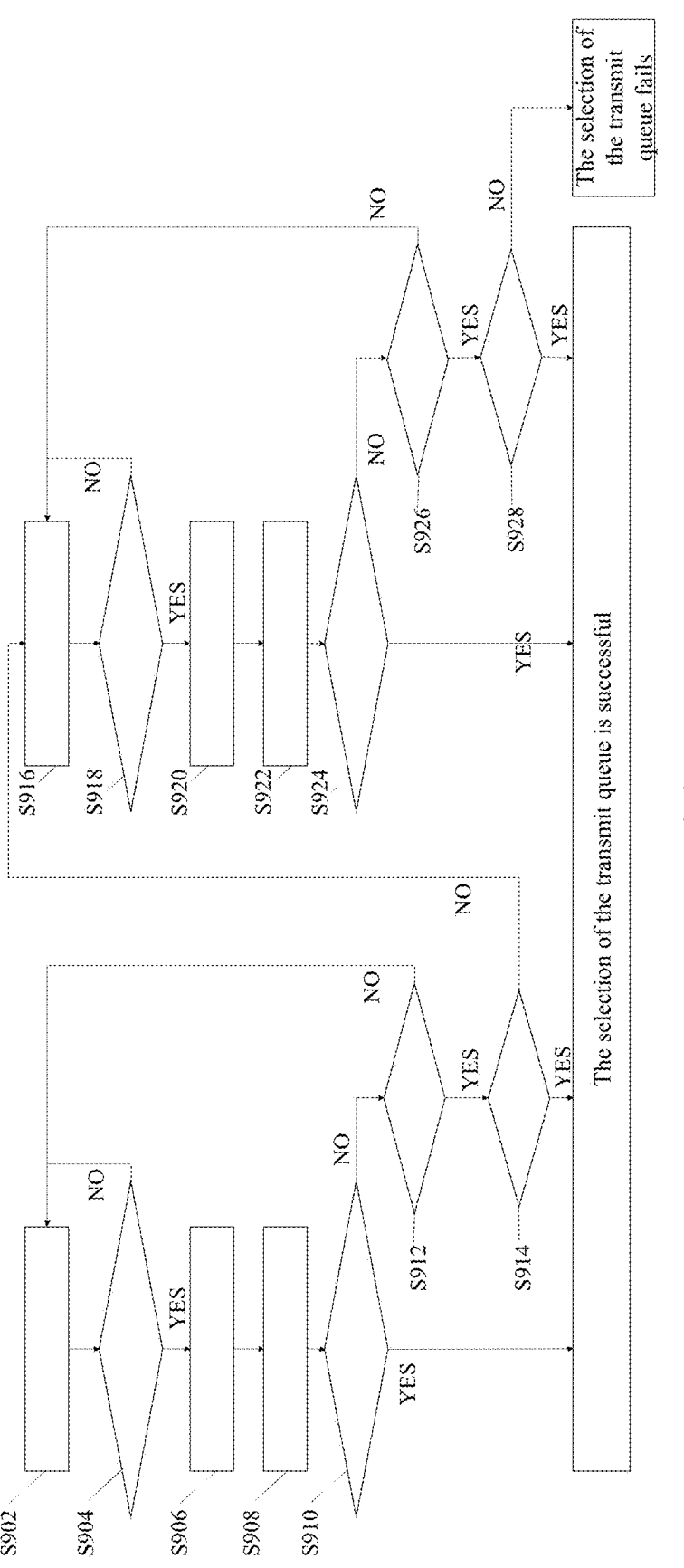
FIG. 9 is a schematic flowchart of selecting a transmit queue at a station device according to an embodiment of the present disclosure.

FIG. 9 shows a specific flowchart for selecting a transmit queue, wherein tb_len is initialized to the maximum length limit of the TB PPDU specified in the base trigger frame.

At step 902, the length information of the first data packet in the next transmit queue in Q_h is read.

When Q_h is read for the first time, the next transmit queue is the first transmit queue in Q_h.

At step 904, it is determined whether the length of the data packet is less than or equal to tb_len; if yes, the process proceeds to step 906; if not, then the process goes to step 902 to loop to the next transmit queue and read the length information of the first packet of the next transmit queue.

At step 906, the present transmit queue is added to the selected queue set Q_sel.

At step 908, the tb_len is updated by subtracting the length of the first data packet in the present transmit queue from the current tb_len as the updated tb_len, and the process proceeds to step 910.

At step 910, it is determined whether the number of traffic identifiers of the transmit queues in Q_sel is greater than or equal to the traffic identifier limit; if yes, it indicates that the selection of the transmit queue is successful and then the process exits; if not, then the process goes to step 912.

At step 912, it is determined whether the present transmit queue is the last queue in Q_h; if yes, the process proceeds to step 912; if not, then the process goes to step 902 to loop to the next transmit queue and read the length information of the first data packet in the next transmit queue.

At step 914, it is determined whether there is a selected queue in the current Q_sel; if yes, it indicates that the selection of the transmit queue is successful and then the process exits; if not, then the process proceeds to step 914.

At step 916, the length information of the first data packet in the next transmit queue in Q_l is read;

When Q_l is read for the first time, the next transmit queue is the first transmit queue in Q_l.

At step 918, it is determined whether the length of the data packet is less than or equal to tb_len; if yes, the process proceeds to step 920; if not, then the process goes to step 916 to loop to the next transmit queue and read the length information of the first packet in the next transmit queue.

At step 920, the present transmit queue is added to the selected queue set Q_sel.

At step 922, tb_len is updated by subtracting the length of the first data packet in the present transmit queue from the current tb_len as the updated tb_len, and the process proceeds to step 924;

At step 924, it is determined whether the number of traffic identifiers of the transmit queue in Q_sel is greater than or equal to the traffic identifier limit; if yes, it indicates that the selection of the transmit queue is successful and then the process exits; if not, the process goes to step 926.

At step 926, it is determined whether the present transmit queue is the last queue in Q_l; if yes, the process proceeds to step 928; if not, then the process goes to step 916 to loop to the next transmit queue and read the length information of the first data packet in the next transmit queue.

At step 928, it is determined whether there is a selected queue in the present Q_sel; if yes, it indicates that the selection of the transmit queue is successful and then the process exits; if not, it indicates that the selection of the transmit queue fails and then the process exits.

If the selection of the transmit queue is successful, a polling method is used to obtain data packets from the selected transmit queues and fill them into the TB PPDU, i.e., the first data packet in each of the selected transmit queues is first put into the TB PPDU in order, and then the second data packet in each of the selected transmit queues is put into the TB PPDU in order, and so on, until the TB PPDU is completely filled. By way of example and not limitation, if a certain data packet cannot be put into the TB PPDU because of the length limitation of the TB PPDU, then it stops getting data packets from the transmit queue corresponding to the present packet in the next time.

Figure 10:
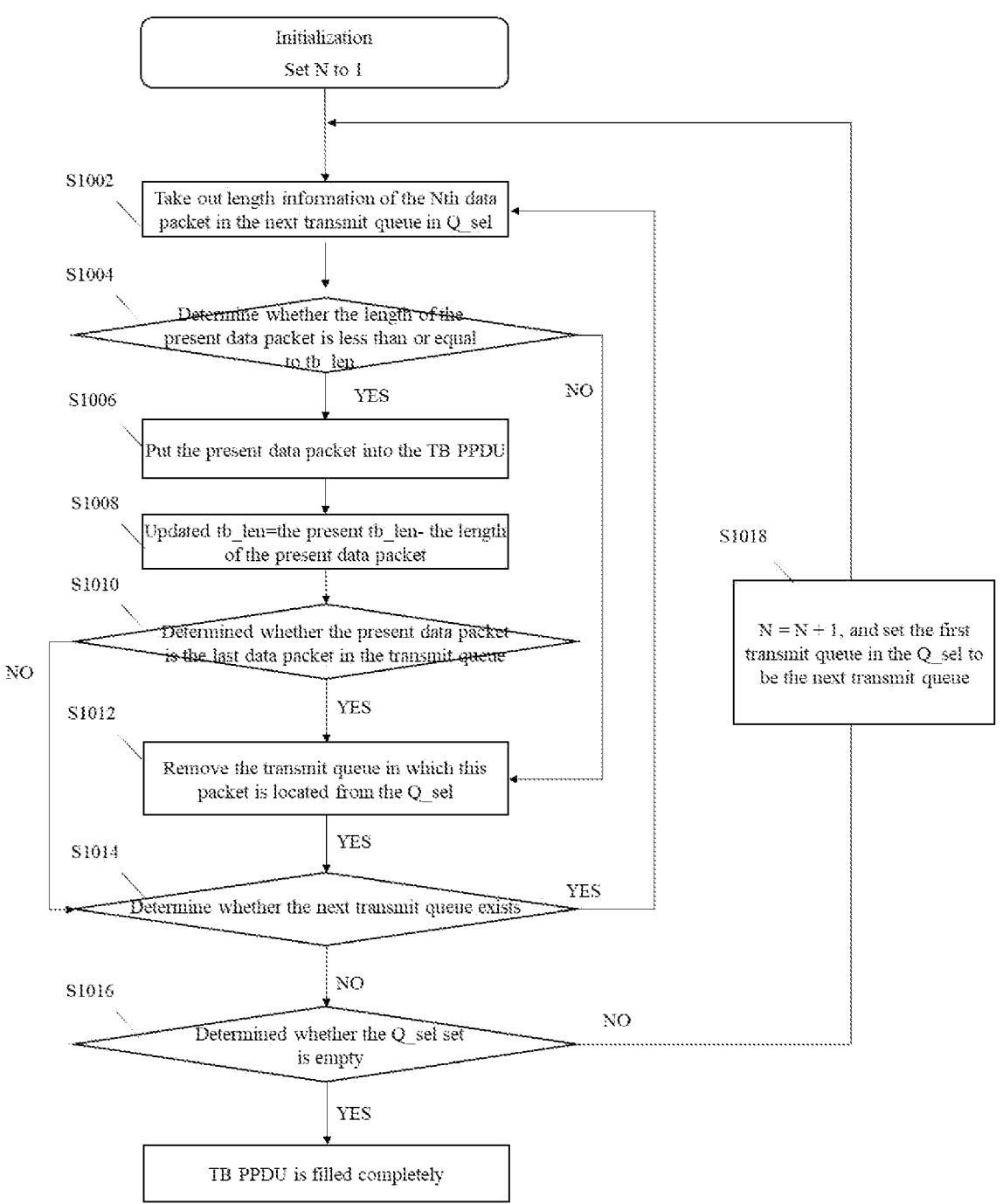
FIG. 10 is a schematic flowchart of obtaining, at a station device, a data packet from a selected transmit queue according to an embodiment of the present disclosure.

As an example, FIG. 10 shows a flowchart for obtaining a data packet from a selected transmit queue, and the main steps are included.

Initialization: N is set to 1.

At step 1002, the length information of the Nth data packet in the next transmit queue in Q_sel is taken out.

When Q_sel is read for the first time, the next transmit queue is the first transmit queue in Q_sel.

At step 1004, it is determined whether the length of the data packet is less than or equal to tb_len; if yes, the process proceeds to step 1006; if not, the process goes to step 1012.

At step 1006, the present data packet is put into the TB PPDU and the process proceeds to step 1008.

At step 1008, the tb_len is updated by subtracting the length of the present data packet from the current tb_len as the updated tb_len, and the process proceeds to step 1010.

At step 1010, it is determined whether the present data packet is the last data packet in the transmit queue in which it is located; if yes, the process proceeds to step 1012; if not, the process goes to step 1014.

At step 1012, the transmit queue in which this packet is located is removed from the Q_sel and the process proceeds to step 1014.

At step 1014, it is determined whether the next transmit queue exists; if yes, the process returns to step 1002 to loop to take out the Nth data packet in the next transmit queue; if not, then the process goes to step 1016.

At step 1016, it is determined whether the Q_sel set is empty; if not, the process proceeds to step 1018, if yes, it means that the TB PPDU is completely filled and then the process exits.

At step 1018, set N=N+1 and set the first transmit queue in the Q_sel to be the next transmit queue.

According to a specific embodiment of the present disclosure, the priority value is mainly determined by two parts, the first part is an EDCA parameter, and the adoption of the EDCA parameter can introduce a certain degree of randomness while maintaining the priority of each transmit queue, to achieve the balanced throughput rate of each transmit queue; the second part is the bsr_info, and the addition of the bsr_info is mainly used in the case that a certain transmit queue buffer has a large amount of data, the resilience of prioritizing transmit can be retained.

As an example of a specific implementation, a specific application scenario is described below.

The parameters of the trigger frame include a preferred access category=0 (AC_BE), a traffic identifier aggregation limit=1, and the total length of the TB PPDUs is 8,000 bytes obtained by calculating the parameters of the basic trigger frame.

Currently there are 4 transmit queues with access categories AC_VO, AC_VI, AC_BE, AC_BK respectively, and the parameters of each of these transmit queues are as follows:

AC_VO: AIFS[AC]=41 µs, CWmin[AC]=3, CWmax[AC]=7, backoff_timer=5, bsr_info=5,000 bytes, and there are a total of 3 data packets in the transmit queue, with lengths of 1,000 bytes, 2,500 bytes, and 1,500 bytes in order respectively.

AC_VI: AIFS[AC]=41 µs, CWmin[AC]=7, CWmax[AC]=15, backoff_timer=7, bsr_info=6,000 bytes, and there are a total of 4 data packets in the transmit queue, with lengths of 800 bytes, 1,500 bytes, 2,000 bytes, and 1,700 bytes in order respectively.

AC_BE: AIFS[AC]=57 µs, CWmin[AC]=15, CWmax[AC]=1023, backoff_timer=3, bsr_info=10,000 bytes, and there are a total of 5 data packets in the transmit queue, with lengths of 2,000 bytes, 3,000 bytes, 2,500 bytes, 2,500 bytes in order respectively.

AC_BK: AIFS[AC]=121 µs, CWmin[AC]=15, CWmax[AC]=1,023, backoff_timer=20, bsr_info=20,000 bytes, and there are 5 data packets in the transmit queue, with lengths of 4,000 bytes, 4,500 bytes, 5,500 bytes, 4,000 bytes and 3,000 bytes in order respectively.

Typical values for some parameters are as follows: factor=1,024 byte/µs, aSlottime=9 µs, $w_1$=2/µs, $w_2$=1/µs.

Based on the above parameters, the priority values for these 4 transmit queues are calculated as AC_VO=−78, AC_VI=−94, AC_BE=−66, and AC_BK=−263.

Here, since the preferred access category of the basic trigger frame is BE, the first group of transmit queues Q_h contains three transmit queues AC_VO, AC_VI and AC_BE, and the transmit queues sorted in descending order according to the priority values are AC_BE, AC_VO, AC_VI. The second group of transmit queues Q_1 has only one transmit queue AC_BK. Since the traffic identifier aggregation limit of the basic trigger frame is 2, at most two transmit queues will be selected eventually, and according to the process of selecting the transmit queues described in the above specific embodiment, the finally selected transmit queues are AC_BE and AC_VO. Continuing to follow the process of obtaining data packets described in the above specific embodiment for the selected transmit queues, the final TB PPDUs can be put with the first data packet (2,000 bytes) in the transmit queue AC_BE, the first data packet (1,000 bytes) in the transmit queue AC_VO, and the second data packet (3,000 bytes) in the transmit queue AC_BE in sequence, and the total length of these three data packets is 7,500 bytes, which is less than the total length of the TB PPDU (8,000 bytes) specified in the basic trigger frame. The second data packet in the transmit queue AC_VO cannot be put into the TB PPDU because the putting of this data packet is going to cause the total length of the selected packet (8,500 bytes) to exceed the total length of the specified TB PPDU (8,000 bytes).

The process of selecting the queue and obtaining the data packet in the embodiments shown in FIGS. 9 and 10 above is illustrated by way of example and not of limitation. In another specific embodiment according to the present disclosure, the process of selecting the queue and obtaining the data packet may be combined as an overall process, wherein the selection and transmission of the data packet are performed directly only for the transmit queue after grouping by access category and sorting by priority, and the specific implementation steps are included as below.

At step 1, a priority value is calculated for each transmit queue, and the formula for calculating the priority value is: priority value=$w_1$*(bsr_info/factor)−$w_2$*(AIFS[AC]+ backoff_timer*aSlottime), wherein the weight coefficient $w_1$ is a non-negative integer, and the weight coefficient $w_2$ is a positive integer, which may be configured by software. When $w_1$ is 0, it means that the priority is determined only by the EDCA parameter. The final calculated priority value is an integer, which can be a positive integer or a negative integer, and the larger the priority value, the higher the priority.

At step 2, all the transmit queues are divided into two groups according to the access categories, a first group of the transmit queues all have a priority of the access category higher than or equal to the priority of the preferred access category of the basic trigger frame, and a second group of the transmit queues all have a priority of the access category lower than the priority of the preferred access category of the basic trigger frame.

At step 3, the first group of transmit queues is sorted in order of the priority value of each transmit queue in descending order and denoted as Q_h, and the second group of transmit queues is sorted in order of the priority value of each transmit queue in descending order and denoted as Q_1.

At step 4, the length of the data packet of each transmit queue in the length buffer module 710 is read according to the total length of the TB PPDU and the relevant parameters of the transmit queues, and the data packets are first prioritized to be selected sequentially from the transmit queues in the first group of transmit queues, and then the data packets are selected sequentially from the transmit queues in the second group of transmit queues. If the selection of a data packet in the queue causes the total length of the selected packets to exceed the packet length limit, the transmit queue is discarded and is no longer considered in the subsequent process. If all transmit queues have been traversed or the number of traffic identifiers of the selected transmit queue is equal to the traffic identifier aggregation limit, the selection of data is successful, then the selection of data packet is completed, and thus the aggregation of AMPDU is completed.

The person skilled in the art can understand that in the embodiments as shown in FIG. 9 and FIG. 10, the step of selecting a transmit queue needs to be completed before proceeding to the step of obtaining a data packet from the selected transmit queue. However, in this embodiment, the process of selecting the transmit queue and the process of obtaining the data packet can be combined, i.e., after taking out the first data packet in each transmit queue, it is determined whether to add the transmit queue to the Q_sel, and if it is added to the Q_sel, then the first data packet in the transmit queue is obtained and is added to the TB PPDU without waiting for the completion of the selection of all the suitable transmit queues and then proceeding with the selection of data packet. Alternatively, the selected set of transmit queues Q_sel may be omitted, and the transmit queues in the same group are first sorted in order of priority, and then the next data packet in the transmit queue in the same group is judged and selected one by one in the order of the first packet, the second packet, . . . the Nth packet, and the discarding of the queue and the AMPDU aggregation are carried out in the same manner as in the above-described embodiment.

According to the methods and devices disclosed herein, as an optional embodiment, the steps of the methods of any of the specific embodiments described above may be performed using a computer program, which is stored on a computer-readable storage medium.

According to the methods and devices disclosed herein, as an optional embodiment, the station device may include a memory and a processor that is communicatively coupled to the memory, the processor is programmed to execute instructions stored in the memory, to cause the processor to perform the steps of the methods of any of the specific embodiments described above. The present disclosure can be realized in hardware, software, or a combination of hardware and software.

The mechanism for selecting transmit queues and their data packets herein allows each transmit queue at the station device to maintain EDCA-like randomness in the case of trigger frame-based uplink data transmission, while taking into account the prioritization of access categories and balancing the throughput rate of each transmit queue at the station.

In addition, the algorithms for selecting transmit queues and their data packets herein are simple, can be implemented by sequencing circuits, and are easy to implement and reuse in hardware.

The above embodiments give specific operational processes and steps by way of example, but it should be understood that the protection scope of the present disclosure is not limited thereto.

While various embodiments of aspects of the present disclosure have been described for the purposes of the present disclosure, it should not be understood to limit the teachings of the present disclosure to these embodiments. Features disclosed in a specific embodiment are not limited to that embodiment, but may be combined with features disclosed in different embodiments. Further, it should be understood that the method steps described above may be performed sequentially, in parallel, combined into fewer steps, divided into more steps, combined and/or omitted in different ways than described. It can be understood by those skilled in the art that more optional embodiments and variations are possible, and that various changes and modifications may be made to the components and constructions described above, without departing from the scope defined by the claims of the present disclosure.

What is claimed is:

1. An uplink transmission method operated by a station (STA) for transmitting data to an access point (AP) in a wireless local area network (WLAN), the method comprising:

receiving, by the station, a trigger frame from the access point, the trigger frame comprising a maximum length limit, a preferred access category and a traffic identifier aggregation limit of an allowed aggregated media access control protocol data unit (A-MPDU), wherein the traffic identifier aggregation limit is configured to identify a maximum number of traffic identifiers allowed to be aggregated by the A-MPDU; and selecting, based on the trigger frame, one or more data packets from a plurality of transmit queues at the station and aggregating them into the A-MPDU to proceed with transmission to the access point, wherein each of the plurality of transmit queues has an access category and a traffic identifier, and each transmit queue comprises zero, one or more data packets;

wherein selecting one or more data packets from the plurality of transmit queues comprises steps of:

determining a priority value for each of the transmit queues;

grouping the transmit queues at the station having an access category priority higher than or equal to a priority of the preferred access category into a first group of transmit queues, and grouping the transmit queues at the station having an access category priority lower than the priority of the preferred access category into a second group of transmit queues, according to an access category of each transmit queue; and selecting data packets from each of the plurality of transmit queues in a manner that the first group of transmit queues is prioritized over the second group of transmit queues and the transmit queues in the same group are sorted in descending order of priority value, such that a total length of the selected data packets does not exceed the length limit of the data packet until one of (i) all of the transmit queues are traversed, and (ii) the number of traffic identifiers of the selected transmit queues is equal to the traffic identifier aggregation limit.

2. The uplink transmission method according to claim 1, wherein the step of selecting data packets from each of the plurality of transmit queues comprises:

polling a first data packet in each of the plurality of transmit queues in a traversal manner, then polling a second data packet in each of the plurality of transmit queues in a traversal manner, until the last data packet in each of the plurality of transmit queues has been polled in a traversal manner.

3. The uplink transmission method according to claim 2, wherein the step of selecting data packets from each of the plurality of transmit queues comprises:

during polling the data packets in each of the plurality of transmit queues in sequence, in response to selecting a data packet in a present transmit queue is going to cause the total length of the selected data packets to exceed the length limit of the data packet, deleting the present transmit queue or skipping the present transmit queue in a subsequent polling.

4. The uplink transmission method according to claim 1, wherein each of the plurality of transmit queues at the station further comprises EDCA parameters, and the EDCA parameters at least comprise a backoff inter-frame interval time (AIFS) and a backoff_timer.

5. The uplink transmission method according to claim 4, wherein the priority value of the transmit queue is obtained by weight calculation of a buffer length and the EDCA parameter of each of the plurality of transmit queues at the station.

6. The uplink transmission method according to claim 4, wherein the priority value is calculated by below formula:

$$\text{Priority value} = w_1 * (\text{bsr\_info}/\text{factor}) - w_2 * (\text{AIFS[AC]} + \text{backoff\_timer} * \text{aSlottime}),$$

wherein bsr_info is a buffer length of each transmit queue;

factor is a parameter that converts the buffer length of each transmit queue into a contention window time;

AIFS[AC] is the backoff inter-frame interval time of each transmit queue corresponding to the access category of the present transmit queue;

backoff timer is the backoff inter-frame interval time that identifies the number of time slots contended by each transmit queue;

aSlottime is a time length of a time slot;

weight coefficient $w_1$ is a non-negative integer; and weight coefficient $w_2$ is a positive integer.

7. The uplink transmission method according to claim 1, further comprising:

storing a length of one or more data packets in each of the plurality of transmit queues at the station by using a linked list, the linked list storing an address of a first data packet in each transmit queue; and obtaining a length of each of other data packets in each transmit queue by looking up the linked list.

8. A station (STA) device configured to transmit data to an access point (AP), the station device comprising: a receiving module, a memory and a decision circuit coupled to the receiving module and the memory respectively; wherein, the receiving module is configured to receive a trigger frame from the access point and decode the trigger frame to obtain a maximum length limit, a preferred access category and a traffic identifier aggregation limit of an allowed aggregated media access control protocol data unit (A-MPDU), wherein the traffic identifier aggregation limit is configured to identify a maximum number of traffic identifiers allowed to be aggregated by the A-MPDU;

the memory is configured to comprise a buffer for a plurality of transmit queues, wherein each of the plurality of transmit queues has an access category and a traffic identifier, and each transmit queue comprises zero, one or more data packets; and the decision circuit is configured to:

obtain a maximum length limit, a preferred access category and a traffic identifier aggregation limit of a trigger frame from the receiving module; and select one or more data packets from the plurality of transmit queues and aggregate them into an A-MPDU to proceed with transmission to the access point;

wherein selecting one or more data packets from the plurality of transmit queues comprises steps of:

grouping the transmit queues having an access category priority higher than or equal to a priority of the preferred access category into a first group of transmit queues, and grouping the transmit queues having an access category priority lower than the priority of the preferred access category into a second group of transmit queues, according to the access category of each transmit queue; and selecting data packets from each of the plurality of transmit queues in a manner that the first group of transmit queues is prioritized over the second group of transmit queues and the transmit queues in the same group are sorted in descending order of priority value, such that a total length of the selected data packets does not exceed the length limit of the data packet until one of (i) all of the transmit queues are traversed, and (ii) the number of traffic identifiers of the selected transmit queues is equal to the traffic identifier aggregation limit.

9. The station device according to claim 8, wherein the decision circuit is configured to select one or more data packets from the plurality of transmit queues at the station and aggregate them into the A-MPDU.

10. The station device according to claim 8, wherein the station device further comprises a length buffer module configured to:

store a length of one or more data packets in each transmit queue by using a linked list, the linked list storing an address of a first data packet in each transmit queue; and obtain a length of each of other data packets in each transmit queue by looking up the linked list.

11. The station device according to claim 10, wherein the decision circuit is coupled to the length buffer module, and the decision circuit is configured to read the length of one or more data packets in each transmit queue from the length buffer module.

12. The station device according to claim 10, wherein the length buffer module comprises a static random access memory (SRAM).

13. The station device according to claim 8, further comprising a length calculation module coupled to the memory, and the length calculation module is configured to calculate a total length of the data packets selected from the plurality of transmit queues.

14. The station device according to claim 8, wherein each of the plurality of transmit queues at the station further comprises EDCA parameters, the EDCA parameters at least comprise a backoff inter-frame interval time (AIFS) and a backoff timer (backoff_timer).

15. The station device according to claim 14, wherein the priority value of the transmit queue is obtained by weight calculation of a buffer length (bsr_info) and the EDCA parameters of each of the plurality of transmit queues at the station.

16. The station device according to claim 14, wherein the priority value is calculated by below formula:

$$\text{Priority value}=w_1*(\text{bsr\_info}/\text{factor})-w_2*(\text{AIFS}[\text{AC}]+\text{backoff\_timer}*\text{aSlottime}),$$

wherein bsr_info is a buffer length of each transmit queue;
factor is a parameter that converts the buffer length of each transmit queue into a contention window time;
AIFS[AC] is the backoff inter-frame interval time of each transmit queue corresponding to the access category of the present transmit queue;
backoff timer is the backoff inter-frame interval time that identifies the number of time slots contended by each transmit queue;
aSlottime is a time length of a time slot;
weight coefficient $w_1$ is a non-negative integer; and
weight coefficient $w_2$ is a positive integer.

17. The station device according to claim 8, wherein the decision circuit comprises a sequencing circuit implemented in hardware.

18. The station device according to claim 17, wherein the decision circuit comprises one or more application-specific integrated circuits (ASICs).

19. The station device according to claim 17, wherein the decision circuit comprises a field programmable logic gate array (FPGA).

20. A non-transitory computer-readable storage medium storing a computer program thereon which, when executed by a processor, causes the processor to implement an uplink transmission method operated by a station (STA) for transmitting data to an access point (AP) in a wireless local area network (WLAN), the method comprising:

receiving, by the station, a trigger frame from the access point, the trigger frame comprising a maximum length limit, a preferred access category and a traffic identifier aggregation limit of an allowed aggregated media access control protocol data unit (A-MPDU), wherein the traffic identifier aggregation limit is configured to identify a maximum number of traffic identifiers allowed to be aggregated by the A-MPDU; and selecting, based on the trigger frame, one or more data packets from a plurality of transmit queues at the station and aggregating them into the A-MPDU to proceed with transmission to the access point, wherein each of the plurality of transmit queues has an access category and a traffic identifier, and each transmit queue comprises zero, one or more data packets;

wherein selecting one or more data packets from the plurality of transmit queues comprises steps of:

determining a priority value for each of the transmit queues;

grouping the transmit queues at the station having an access category priority higher than or equal to a priority of the preferred access category into a first group of transmit queues, and grouping the transmit queues at the station having an access category priority lower than the priority of the preferred access category into a second group of transmit queues, according to an access category of each transmit queue; and selecting data packets from each of the plurality of transmit queues in a manner that the first group of transmit queues is prioritized over the second group of transmit queues and the transmit queues in the same group are sorted in descending order of priority value, such that a total length of the selected data packets does not exceed the length limit of the data packet until one of (i) all of the transmit queues are traversed, and (ii) the number of traffic identifiers of the selected transmit queues is equal to the traffic identifier aggregation limit.

* * * * *